United States Patent [19]

Fernandez

[11] Patent Number: 4,463,961

[45] Date of Patent: Aug. 7, 1984

[54] MANUALLY MOVING A TRAILER

[76] Inventor: Alexander T. Fernandez, 4074 Gratiot Ave., Port Huron, Mich. 48060

[21] Appl. No.: 307,222

[22] Filed: Sep. 30, 1981

Related U.S. Application Data

[63] Continuation of Ser. No. 93,509, Nov. 13, 1979, abandoned, which is a continuation-in-part of Ser. No. 895,443, Apr. 11, 1978, abandoned.

[51] Int. Cl.$^3$ .............................................. B60K 9/00
[52] U.S. Cl. ......................................... 280/3; 74/531; 180/16; 180/74; 280/246; 301/44 T
[58] Field of Search ............... 280/414.1, 414.2, 414.3, 280/3, 47.13 B, 151, 218, 246, 446 B, 1.181; 180/2; 192/43.1, 50; 74/13, 14, 531, 577 R, 575; 301/44 R, 44 T, 6 D, 6 W; 188/74, 16, 120, 67, 63; 172/351, 352

[56] References Cited

U.S. PATENT DOCUMENTS

| | | | |
|---|---|---|---|
| 402,747 | 5/1889 | Laguire | 81/63 X |
| 1,378,563 | 5/1921 | Schofield | 301/6 D |
| 1,441,645 | 1/1923 | Van Orden | 301/44 T |
| 1,543,958 | 6/1925 | Sutherland et al. | 280/151 |
| 1,855,238 | 4/1932 | Higbee et al. | 188/16 X |
| 2,002,570 | 5/1935 | Faries et al. | 280/3 |
| 2,055,860 | 9/1936 | Faries et al. | 280/3 |
| 3,887,204 | 6/1975 | Austin | 280/3 |
| 3,899,048 | 8/1975 | Huvers | 188/16 |
| 3,937,479 | 2/1976 | Dalton | 280/3 |

FOREIGN PATENT DOCUMENTS

| | | | |
|---|---|---|---|
| 725777 | 5/1932 | France | 172/352 |
| 858906 | 1/1961 | United Kingdom | 280/3 |

Primary Examiner—John A. Pekar
Attorney, Agent, or Firm—Harness, Dickey & Pierce

[57] ABSTRACT

This is an accessory for a two wheeled trailer composed basically of three parts for each wheel: a wheelpiece that fastens to the outside of the wheel and that contains in its center a hexrod; a long-handled ratchet that fits in place over the hexrod of the wheelpiece and that contains a long wooden handle which can be taken in hand to rotate the wheel, tied to the trailer frame, or left on the ground to prevent backwards rotation of the wheel in relation to the ground or the trailer frame; and, a mechanical brake that also fits in place over the hexrod of the wheelpiece to control motion and to use in conjunction with the long-handled ratchet for leverage. This invention enables a single individual to easily move a heavily loaded two wheeled trailer over difficult terrain, such as a two wheeled boat trailer on a beach, if one or several techniques are used for leverage and control.

15 Claims, 12 Drawing Figures

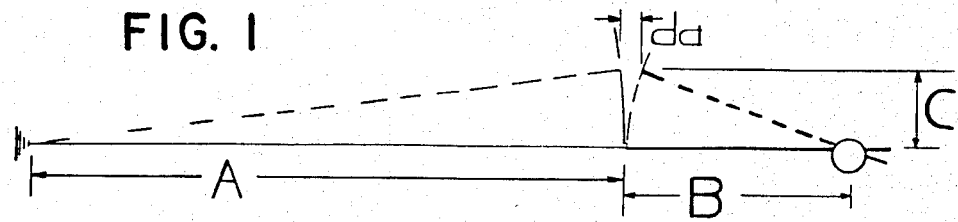
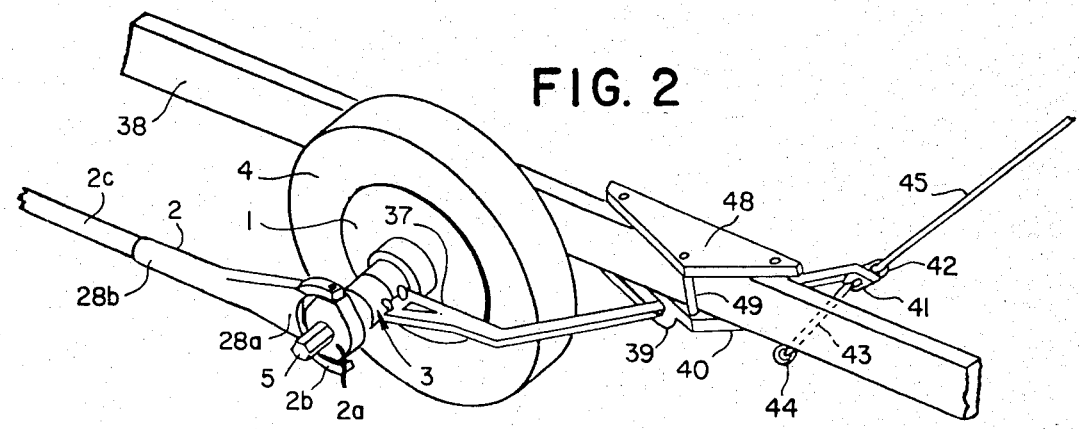
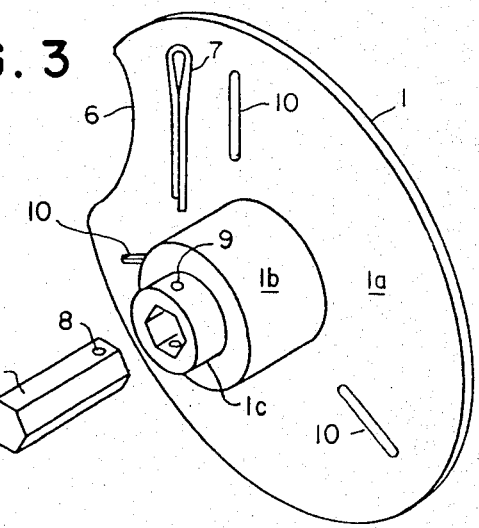
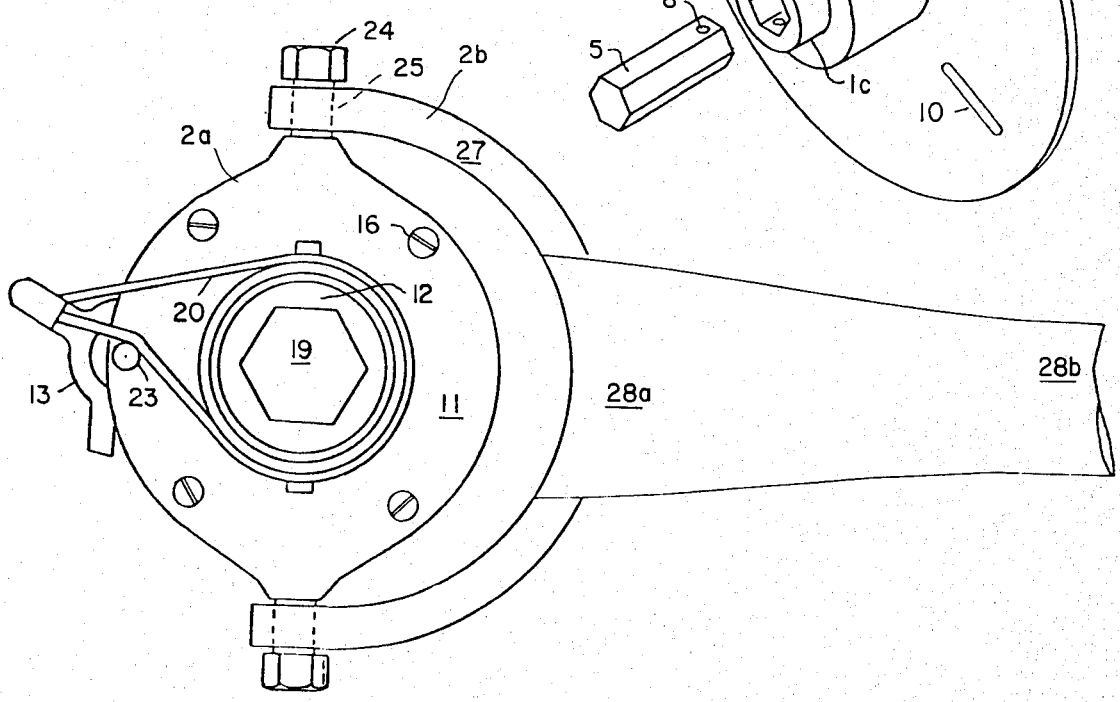

MANUALLY MOVING A TRAILER

RELATED APPLICATION

This application is a continuation of my application Ser. No. 093,509, filed Nov. 13, 1979, now abandoned, which is a continuation in part to a prior application Ser. No. 895443, filed Apr. 11, 1978, now abandoned.

BRIEF SUMMARY OF THE INVENTION

The object of this invention is to provide a means by which a boat can be inexpensively and easily maintained on the beach in its own trailer by enabling the boat and trailer to be easily moved over the beach and into or out of the water manually by one person.

The object of this invention is to enable any two wheeled highway trailer to be manually moved and controlled by one person.

Another object of this invention is to enable any small two wheeled highway trailer to be used as a large capacity gardening cart, and to enable that same trailer to be used, with additional implements, to manually tear up ground and cultivate soil for a garden.

Another object of this invention is to provide the components for a basic machine by which human energy can be converted into mechanical energy to do a variety of chores efficiently and economically.

This invention was conceived for use on a boat trailer on the shore of a large and often violent body of water. Here boats and boat hoists left in the water during the boating season were regularly destroyed by bad weather. Only small, lightweight boats could be easily beached even with air rollers and leaving a boat at a marina for the summer had its own expenses and inconveniences. A boat trailer was difficult to move over soft sand, and any track or ramp placed beside the water would be buried or removed by the water in a short time even in moderate weather.

A two wheeled boat trailer contains a weight distribution and shape that enables a boat and trailer to be easily moved by hand by one individual over difficult terrain if certain restraints of motion are maintained to obtain leverage and control. This invention adapts a two-wheeled trailer to move a boat over a beach and into or out of the water by accomplishing the following functions: it enables the trailer's wheels to roll forward only or backward only; it enables the direction in which the wheels are allowed to roll to be changed from forward to backward or vice versa even while the trailer is being held on a grade; it enables the trailer to be slowed or stopped in both directions; and it enables each wheel to be turned by a long handled ratchet for moving a wheel out of a hole and up onto a board for a firm support under the wheel.

A slightly negative or neutral trailer tongue weight is desirable for manually moving a trailer. The positive tongue weight of a boat trailer can be easily lessened by moving the boat back on the trailer, and on most trailers the bow post can be moved back for using the trailer on the beach. The length of the trailer tongue forward of the wheels is about three times the distance between the wheels on most trailers. This length provides leverage for several techniques of moving a trailer, and any trailer tongue can be easily lengthened if it is desirable to do so.

Restricting the wheels of a two wheeled trailer to roll forward only allows the tongue or front of the trailer to be used as a lever to advance the position of one wheel as the opposite wheel is used as a pivotal point; by moving the trailer's tongue from one side to the opposite side and back again the trailer is advanced one wheel at a time. By changing the direction of rotation of the wheels from forward only to backward only the boat and trailer can be backed into the water by this same procedure.

If the softness of the ground and the steepness of the grade up which the trailer is ascending produce more than a moderate resistance, this technique, without further modification, becomes very inefficient. With sufficient resistance on the forward moving wheel, the pivot wheel will dig a hole as it pivots and moves backwards without rotating. When the pivot wheel is then the wheel being moved forward its resistance will be increased by the hole it has dug while being the pivot wheel. This plowing action is eliminated by placing a wooden plank under each wheel, and the resistance is reduced to the grade up which the trailer is ascending times the combined weight of the boat and trailer. The mechanical advantage of the one wheel at a time technique is equal to twice the length of the trailer tongue forward of the wheels over the distance between the wheels. The trailer tongue length over the distance between the wheels is the leverage on one wheel and only one wheel is moved at one time. With the resistance and the mechanical advantage known, the force required to move a given boat and trailer up a given grade can be calculated. For example, a boat and trailer with a combined weight of 1500 pounds ascending a 15% grade would have forward resistance of 225 pounds, 1500×15%. If the distance between the wheels is five feet and the trailer tongue extends 15 feet forward of the wheels, then the mechanical advantage is six to one (2×15/5). A force of 39 pounds, 225/6, would be required to move each wheel forward with this technique and this boat, trailer, and beach slope.

This force could be employed by lifting the trailer tongue to a comfortable chest height position and pushing and pulling it from side to side in an arc or about one foot. On each foot push or pull of the tongue one wheel will advance four inches, 12/3, and will move laterally 0.13 inches, $60'' \sqrt{60^2 - 4^2}''$. Due to this small lateral movement a narrow but lightweight two by four is sufficient to support under a wheel. A long wooden board with a heavy wheel sitting on one end can be easily aligned in the direction the wheel will travel. The wheels can be rolled out of soft sand up onto the boards with the long handled ratches. If a wheel requires additional traction a traction device can be fastened over the tire temporarily before the wheel is turned up onto the board.

This wheel traction device and a trailer tongue extension that pivots slightly to automatically operate one brake at a time could be useful with this invention and are therefore both shown in the drawings.

Considerable leverage can be obtained for pulling a two wheeled trailer forward by lifting the tongue or front of the trailer up into the air while it is tied by a line in tension to a forward stationary object, such as a large tree. (See FIG. 1) The mechanical advantage and the distance advanced by each lift of the tongue can be calculated if the length of the line A; the length of the trailer forward of the wheels B; and the height of the lift C are known. The mechanical advantage, MA, is equal to A/C. The distance advanced by each lift of the tongue, DA, is equal to $A - \sqrt{A^2 - C^2} + B - \sqrt{B^2 - C^2}$.

For example if A, B, and C are 40, 15 and 5 feet respectively, then MA is 40/5 or 8 to one, and DA is equal to 0.314+0.858 or 1.17 feet minus the stretch in the line. If A, B, and C are 100, 15, and 5 feet, then MA is 20 to one, and DA is 0.125 plus 0.858 or 0.983 feet.

This tongue lift while tied employment of the invention is augmented by moving the boat back on the trailer. This produces a negative tongue weight which forces the front of the trailer to raise up into the air if it is not held down. This negative tongue weight can be used as lifting power for this employment of the invention. For example, if the mechanical advantage is 20 to one and the negative tongue weight is 80 pounds, then the forward pull when the tongue is released from the horizontal position with the line tight is 20 times 80 or 1600 pounds. This force of 1600 pounds exceeds that needed to pull a trailer over the beach with or without a firm support under the wheels. This forward force and movement is applied quickly with the distance gained by each lift being held by the ratchet on each wheel (or by the brakes).

The full advantage of this technique of moving a trailer can be obtained only with a strong low-stretch line. A strong tight line can be obtained by running a short winch line from the winch on the trailer's bow post out to a loop or fitting on a long steel rope from a forward stationary object. The low powdered winch on the bow post can quickly tighten the line before the tongue is lifted or allowed to rise up to move the boat and trailer forward.

Considerable leverage can be obtained by leaving the long handles of the ratchets on the ground in front of the trailer with the ratchets set to allow only forward rotation of the wheels. In this situation the trailer can be advanced by lifting the tongue up into the air and then lowering it with the brakes applied. Applying the brakes immobilizes the wheels in relation to the trailer frame and enables the lowering motion to be applied to the wheels to roll them forward.

This technique can be applied without the brakes if two long handled ratchets are placed on one wheel with one handle tied to the trailer frame and one handle left on the ground. This lift and lowering motion can propel the trailer backward if the wheels are enabled to roll backward only rather than forward only. The torque applied to the wheels by the lowering (or lifting) motion with the brakes applied is equal to the lowering (or lifting) force times the length of the trailer tongue forward of the wheels. For example a 100 pound lowering force with the brakes applied could produce a 1,500 foot pound torque on the wheels with a trailer tongue length of 15 feet forward of the wheels.

The brakes enable the trailer to be controlled while descending a hill over hard ground or over wooden planks. The brakes can also be tightened to immobilize a trailer on planks at the water's edge while the boat is taken from rough water. The one wheel at a time technique can be used without the ratchets by applying the brake on one wheel at a time. This would be useful on a trailer that required manual movement over relatively firm ground. A trailer tongue extension that pivots slightly to pull each brakeline independently would enable the pivot wheel to be braked automatically.

This invention is a trailer accessory that provides leverage to manually move a two wheeled trailer by several techniques: moving one wheel forward at a time; lifting the trailer tongue while it is tied with a tight line to a forward object; lifting and lowering the tongue to apply rotation to the wheels; turning each wheel separately with a long-handled ratchet; or, any combination of these techniques. These motions by which a trailer is moved with this invention can produce other desirable results besides moving the trailer.

If an implement is fastened beneath the trailer behind the axle and in compression between the ground and the trailer, a lifting of the trailer tongue will drive the implement into the ground. If the trailer tongue is long and the implement is close to the axle, considerable force can be generated for forcing the implement into the ground. For example, if the trailer tongue is 15 feet forward of the axle and the implement is one foot behind the axle, a 40 pound lifting force will produce a 600 pound, 15/1×40 lb. force for driving the implement into the ground assuming weight of the trailer keeps the wheels on the ground. With an implement behind the axle, the lifting and lowering of the trailer tongue could be applying slow high torque rotation to the wheels to advance the trailer as well as cutting up the ground behind the wheels as the trailer moves forward. The distance the implement is forced into the ground is determined in part by the height of the trailer tongue is lifted. to work a very small area of ground, a trailer could be walked in a circle, pivoting around one wheel once or several times with the tongue lifted to the height that holds the implement to the desired depth in the soil. The size and shape of the implement and the angle it is to penetrate the soil would vary according to the size and shape of the trailer, and the composition of the soil that is to be worked, and the type of cultivation that is to be done to the soil.

This invention can also provide the components for a machine for converting human energy into mechanical energy for other uses. A 150 pound person putting all his weight at the end of a 5 foot ratchet handle will impart a torque of 750 foot pounds, 150×5, to the turning of a trailer wheel or to the acceleration of a rotating hexagonal shaft for another mechanical use of human energy. The basically shaped wheelpiece can be bolted onto the outside of a trailer wheel or to another object such as an energy conserving flywheel. The mechanical brake can be used as a bearing to support a hexagonal shaft by placing a low friction bushing between the inside cylinder and the outside cylinders and bolting the lever that is fastened to the outside cylinders firmly in place. This invention was initially conceived for moving a boat and trailer over the short of an often rough body of water, but this invention or its components can also be used to tap manual power for a variety of uses.

The three basic parts of the invention are for each wheel a workpiece, a long handled ratchet, and a mechanical brake. The wheelpiece has a flat circular base that fits in place on the outside of that part of the trailer wheel that holds the cord of the tire. This standardizes the wheelpiece for any wheel of a given tire rim size; the base of the wheelpiece would be 7/8 of an inch larger in diameter than the rim size of the tire of the tire for most tire rim sizes. The cup shaped center of the wheelpiece is raised to a surface several inches above the base to accommodate the axle of the wheel and to extend the hexrod out away from the wheel and the fender. The hexrod extends from the center of the raised portion of the wheelpiece in the axis of the rotation of the trailer wheel. There is a cutout section in the base to accommodate the tire valve stem.

On many trailer wheels there are several spaces between the steem rim and the central steel flange of the wheel. The wheelpiece can be fastened to the wheel by long screws run through the wheelpiece and into plugs in the spaces between the rim and the flange of the wheel. When the rim and the flange of the trailer wheel are one piece and without spaces the wheelpiece can be fastened to the wheel by self-threading screws run through the wheelpiece and into holes drilled in the center part of the trailer wheel.

The long handled ratchet consists of a ratchet head that pivots within a two pronged fork, a steel cylindrical body that contains the two pronged fork, and a round wooden handle that fits inside the cylindrical body to lengthen it for leverage. (See FIGS. 2 and 4) The ratchet head consists of a casing, bushings, a spur gear, and a two-way latch that reacts with the gear. The latch is held in contact with the gear by the tension of a shockcord on the outside of the casing. To change the direction of rotation of the gear and therefore the wheel, the shockcord can be readjusted for tension to force the latch into contact with the gear in the opposite direction. This readjustment of the shockcord to change the wheel rotation will not require the latch to be disengaged from the gear. While a trailer is not in motion the latch and gear of the ratchet are almost always engaged and disengage only while the trailer is moving or when the trailer tongue is moved.

The need for a brake on a manually moved trailer varies with the size, weight, and use of the trailer as well as the slope of the terrain over which the trailer is to be moved. Some trailers can be braked by simply pushing the trailer tongue into the ground, and others require only a very light duty mechanical brake. Other trailers require a heavier brake. I have shown two mechanical brakes here.

The first brake is two outside cylinders fastened to a lever and encompassing an inside cylinder that turns with the hexrod and the wheel. (See FIGS. 2, 6, 7, and 8) Deflection of the lever moves the outside cylinders, one forward and one backward, into contact with the inside cylinder for braking. A line is fastened from the end of one brake lever to the end of the brake lever on the other side of the trailer. A shockcord at the end of each lever maintains tension in this line and holds the lever in place. A second line fastened to the center of the line between brake levers extends to the front of the trailer where it can be pulled to operate the brakes.

The second brake consists of a drum that fits over the hexrod of the wheelpiece and a strap that is pulled tightly over the drum for braking the wheel. (See FIGS. 9 and 10) The straps are tightened by a line between the straps run through eyebolts on the trailer opposite to the straps. Fastened in the center of this line running across the trailer to each strap is a second line that extends to the front of the trailer where it can be pulled to tighten the cross line and therefore the straps to brake the wheels. While the brakes are not applied the cross-line is held taut by shockcords from each drum to the crossline. The eyebolts opposite the drums can be placed on a cross piece bolted to the trailer frame as shown in FIG. 9 or they could be placed on the fenders above the wheels (not shown).

Two supplementary parts of this invention are a trailer tongue extension that pivots slightly to pull lines to brake levers individually and a wheel traction device that can be placed over the outside of the tire for traction in turning the wheel out of a deep hole in the sand. The pivoting trailer tongue extension is 'T' shaped and pivots slightly about the point where the cross stems meet the vertical stem of the 'T'. The individual brake lines are fastened at the ends of the cross tems and are therefore loosened or tightened as the vertical stem pivots while the leading end of the extension is moved to the right or the left.

The wheel traction device is adjusted to fit closely around the outside of a particular tire, and it contains a base that extends beyond the tire on the inside and the outside of the wheel. The base of the tire could be enlarged by a series of traction devices placed around the tire and fastened one device to the next device or to the wheel or to the wheelpiece to hold them in place. There would be little advantage in doing this, however, and a traction device would seldom need to be used for rotating a wheel up onto a board from soft sand. This traction device is important because this invention is a trailer accessory that can be placed on any two wheeled trailer at a beach, and it must be versatile to protect a boat and trailer in a variety of situations.

DESCRIPTION OF THE DRAWINGS

FIG. 1 is a diagrammatic side view of a trailer tied by a line in tension to a distant object. Four distances A, B, C, and da are ashown. These distances are used to calculate leverage and distance advanced by each lift of the tongue.

FIG. 2 is a broken away perspective view of a trailer embodying the invention showing the long handled ratchet, wheelpiece, and brake on one wheel.

FIG. 3 is an enlargement in perspective of the wheelpiece with a removable hexrod.

FIG. 4 is a side view of the long handled ratchet with the wooden handle extension omitted.

DESCRIPTION OF THE INVENTION

Figure 5:
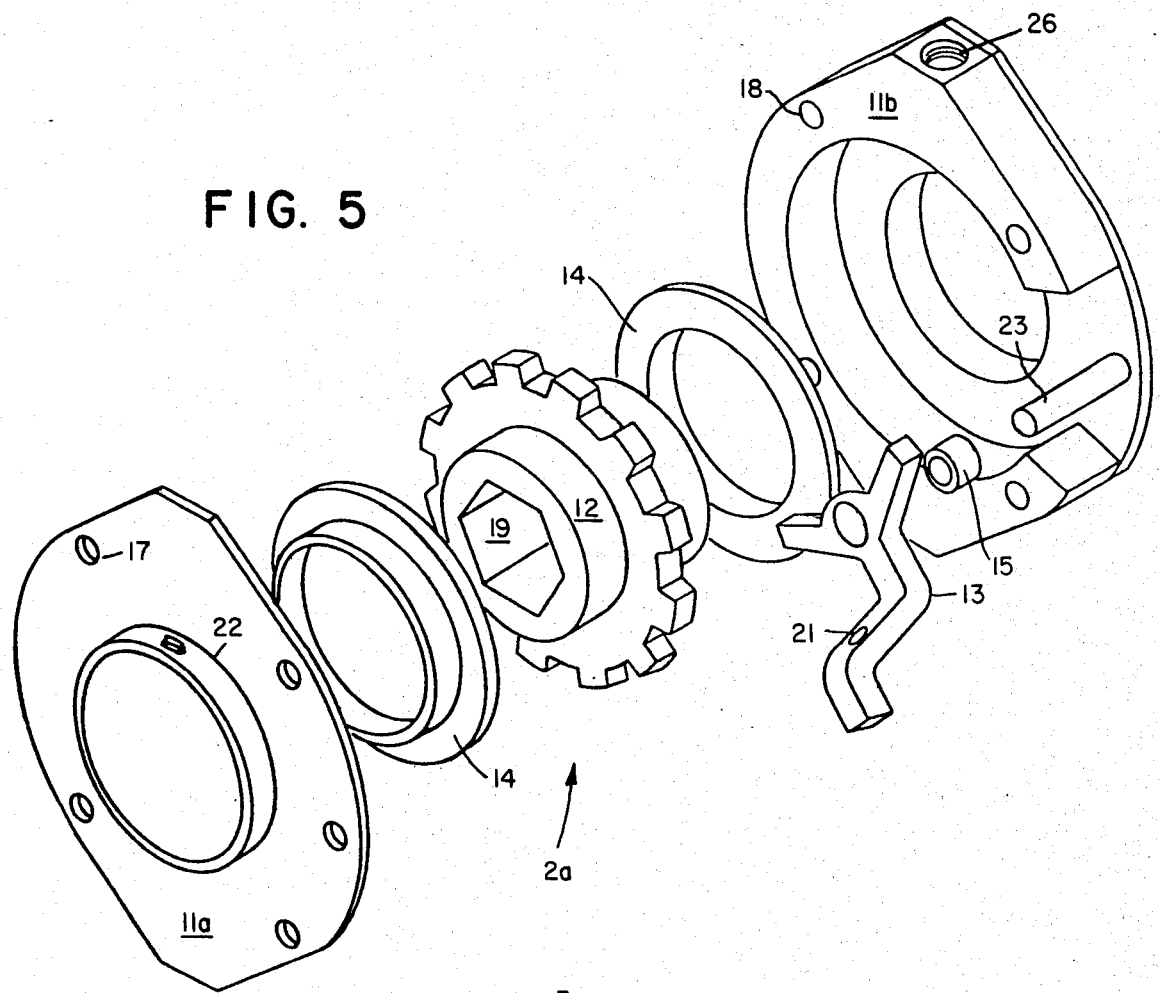
FIG. 5 is an exploded view of the ratchet head of the long handled ratchet.

This invention fastens to a trailer to enable it to be easily moved by hand by only one person. It provides leverage on the trailer and on each individual wheel by several techniques as previously explained. This invention consists of a wheelpiece 1, a long handled ratchet 2, and a brake 3. The wheelpiece 1 fastens to the outside of the trailer wheel 4. The wheelpiece has a flat circular base 1a that fits across the outside of the trailer wheel 4 on that holds the cord of the tire, not shown. The circular base 1a is cut out in one part 6 for access to the valve stem of the tire. The wheelpiece 1 has a convex cup-shaped center 1b to accommodate the axle of the wheel 4 and to position the hexrod 5 out away from the wheel 4 and the fender, not shown. The raised center 1b of the wheelpiece 1 contains a fitting 1c to hold the hexrod 5 in place in the axis of rotation of the wheel. The hexrod 5 is held in place in the fitting 1c by a cotter pin 7 run through holes 8 and 9 in the hexrod 5 and the fitting 1c. For fastening the wheelpiece 1 to the wheel 4, several self-threading screws, not shown, can be run through holes 10 in the wheelpiece and into plugs in the spaces, not shown, in the wheel. If the wheel 4 is constructed without spaces, the self-threading screws would be screwed into holes drilled into the center of the wheel 4.

The second component of this invention is a long handled ratchet 2 that is three parts; a ratchet head 2a, a metal two pronged fork 2b within which the head 2a pivots and a long wooden handle 2c; that lengthens the two pronged form 2b for leverage.

The ratchet head 2a contains a metal casing 11, a double hubbed spur gear 12 and a two directional latch 13 that reacts with the gear 12 to enable it to turn in only one direction. (See FIGS. 4 and 5) There are low friction bushings 14 and 15 between the casing 11 and the spur gear 12 and between the casing 11 and the latch 13 and the rod 23 around which the latch 13 pivots. The front and the back of the casing 11a and b are fastened together by several screws 16 through holes 17 in the front of the casing 11a into holes 18 in the back of the casing 11b. The two hubbed spur gear 12 has a hexagonal aperture 19 that fits the hexrod 5 of the wheelpiece 1. The latch 13 is held in contact with the spur gear 12 by a shockcord 20 in tension. The shockcord 20 runs through a hole 21 in the latch 13 around the outside flange 22 of the casing 11 back around the cylindrical rod 23 which holds the latch 13 and back to the hold 21 in the latch 13. The direction of rotation of the ratchet can be changed by stretching both parts of the shockcord 20 over the circular rod 23 for tension to move the latch 13 in the opposite direction. The latch 13 will then change direction when motion of the trailer, the wheel 4 or the ratchet 2 frees the latch 13 from the spur gear 12.

A bolt 24 is placed through the hole 25 in each side of the two pronged form 2b and the bolt 24 is threaded into a hole 26, on both the top and the bottom of the ratchet head 2a. A clearance fit between the fork 27 and the bolts 24 enables the handle 28b and 2c to swing out away from the trailer frame 38 or in towards the frame 38 as desired.

The two pronged form 2b is constructed from a piece of metal tubing 28a and a rectangular metal rod 27 formed into a semicircular shape. One end of the tube 28a is flattened and welded to the semicircular shaped rod 27 that forms the two prongs within which the ratchet head 2a pivots. A round length of wood 2c is placed in the other end of the metal tube 28b of the two pronged form to lengthen the handle for leverage.

Figure 6:
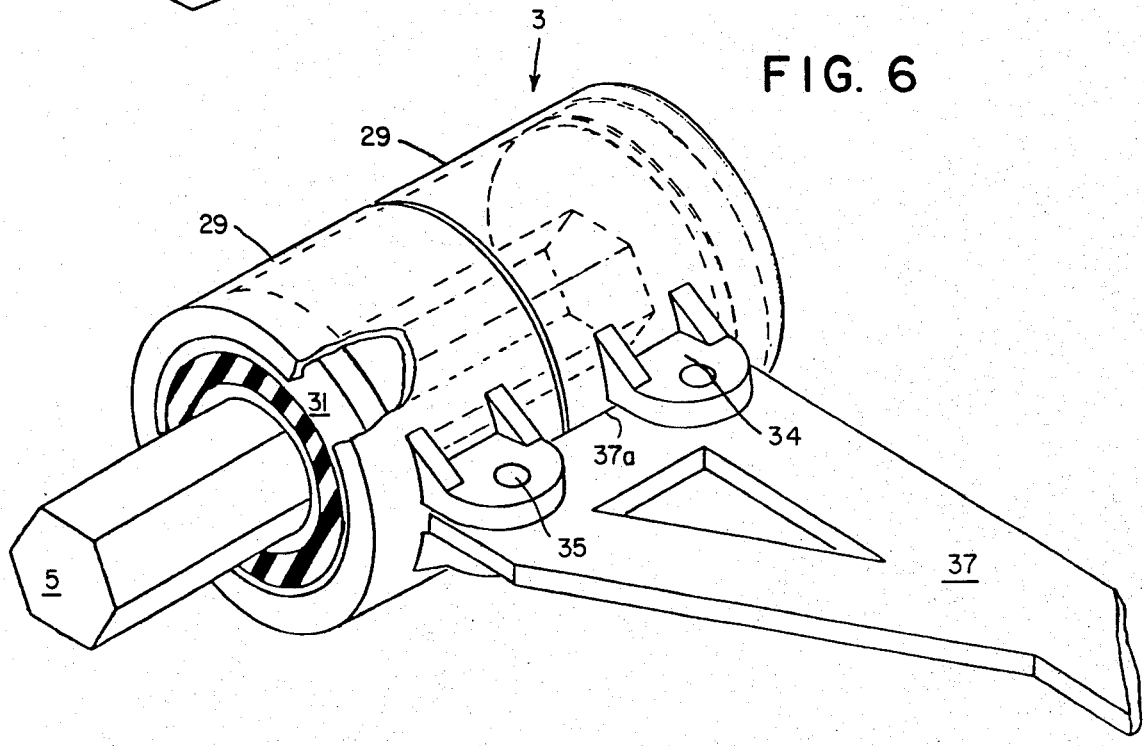
FIG. 6 is an enlargement in perspective of the brake shown in FIG. 2 with the insides shown in hidden lines and in a cut away section.
Figure 7:
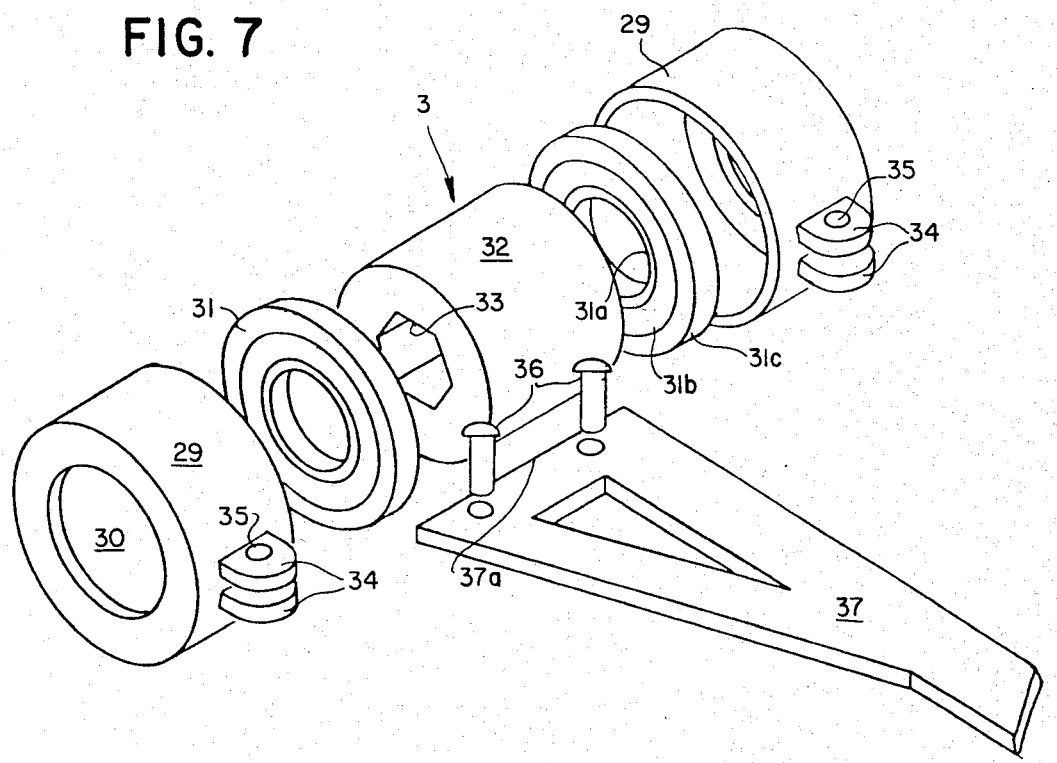
FIG. 7 is an exploded view of the brake shown in FIG. 6.

The third component of this invention is a brake 3. This brake 3, like the long handled ratchet 2 fits over the hexrod 5 of the wheelpiece 1. (See FIGS. 2, 6 and 7)

This brake 3 starts with a cup shaped cylinder 29 containing a hole 30 in the bottom of the cup. Placed in the bottom of this cup shaped cylinder 29 is a washer 31 composed radially of three parts. The insidemost part 31a provides a low friction surface between itself, 31a, and the hexrod 5 that will turn in its center. The next part out from 31a, 31b, is a ring of laytex rubber or any other material that will maintain its shape but will deform under pressure elastically. Out from this center part 31b is the outer ring of 31, 31c. This part 31c provides a low friction surface contact with the inside of the cup shaped cylinder 29. Inside the outer cylinder 29 on top of the washer 31 is placed a metal cylinder 32 that contains a hexagonal hole 33 through its center. A second washer 31 (identical to the first washer 31) is then placed on top of this inside cylinder 32 and a second outside cylinder 29 is placed over the inside cylinder 32 and second washer 31.

On the outside of each outside cylinder 29 there are two metal plates 34 each containing a hole 35 through which a metal pin 36 fastens the outer cylinder 29 to the end of the brake lever 37. When the end 37a of the brake lever 37 is parallel to the hexrod 5 the outer cylinders 29 will turn on the low friction surfaces provided by the washers 31 at the bottom of each cylinder 29. When the brake lever 37 is deflected from parallel the washers 31 will be elastically deformed as the high friction surfaces of the inside cylinder 32 (that turns with the hexrod 5 and the wheel 4) comes firmly into contact with the surfaces of the outer cylinders 29.

The brake lever extends forward around the wheel 4 and in across the trailer frame 38 through a slot 31 on a plate 40 bolted to the bottomside of the trailer frame 38. At the end of the brake lever 37 there are two eyes 41 and 42. Eye 41 contains a shockcord 43 fastened in tension to another eye 44 contained on the plate 40 that is bolted to the trailer frame 38. This shockcord 43 holds the brake lever 37 in position with the brake 3 not applied. The other eye 42 at the end of the brake lever 37b is fastened to a steel wire rope 45 which fastens to the brake lever 37 on the opposite wheel 4 at the opposite eye 42. This crossline 45 is tightened by another line (not shown) running from the center of the crossline 45 to the front of the trailer or the trailer tongue 47.

The metal plate 40 that contains the slot 39 for the brake lever 37 and an eye 41 for the shockcord 43 is bolted to the underside of the trailer frame 38 by sandwiching the frame 38 between this plate 40 and another plate 48 and bolting them, 40 and 48, together by three bolt and nut combinations 49.

Figure 8:
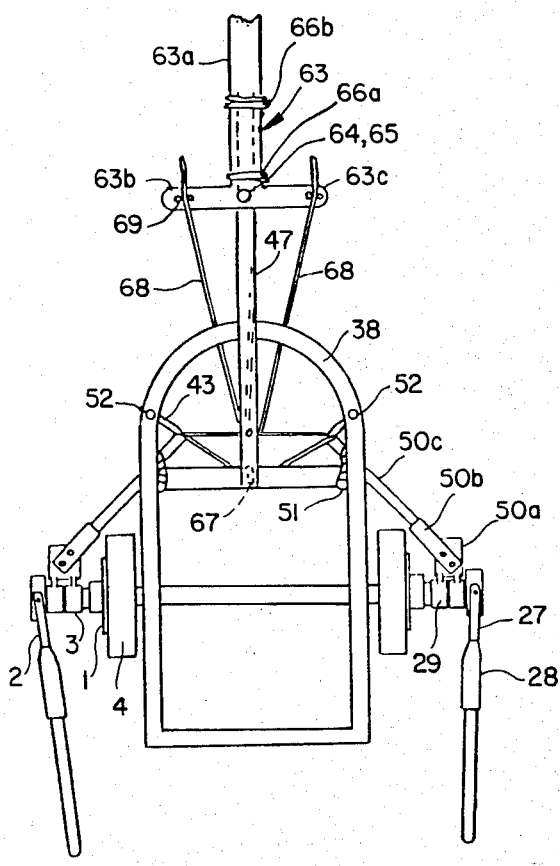
FIG. 8 is an aerial view of a trailer showing wheelpieces, long handled ratches and brakes. The solid one piece brake levers as shown in FIGS. 2, 6 and 7 are replaced by a lever that has a wooden handle reinforced by a metal pipe. This lever is adjustably bolted to a rectangular metal plate that is fastened to the outside brake cylinders of the brake. The bracket that bolts to the trailer frame as shown in FIG. 2 is replaced here by a line fastened between the trailer frame and the wooden brake lever. This figure also shows the 'T' shaped trailer tongue extension and the lines that operate the brakes.

An alternate construction for the brake lever is shown in FIG. 8. Here the outside cylinders 28 are fastened to a rectangular metal plate 50a. A wooden handle 50c reinforced by a piece of metal tubing, 50b, is also bolted to the rectangular plate 50a. The metal bracket 39 is replaced by a line 51 that loosely ties the wooden handle 50c to the trailer frame 38. The shockcord 43 is tied from the end of the wooden handle 50c to an eye 52 on the trailer frame 38. The shape of this alternate brake handle, FIG. 8, can be altered to fit a variety of trailers and the metal bracket 39 shown in FIG. 2 is omitted.

Figure 9:
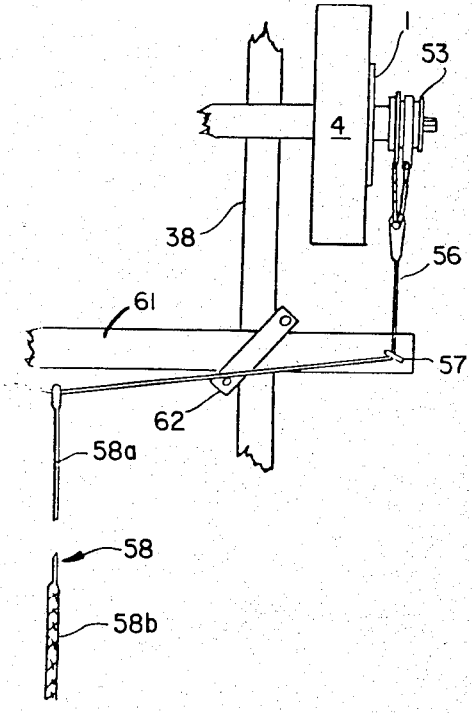
FIG. 9 is an elevational view of an alternate brake as shown on one wheel.
Figure 10:
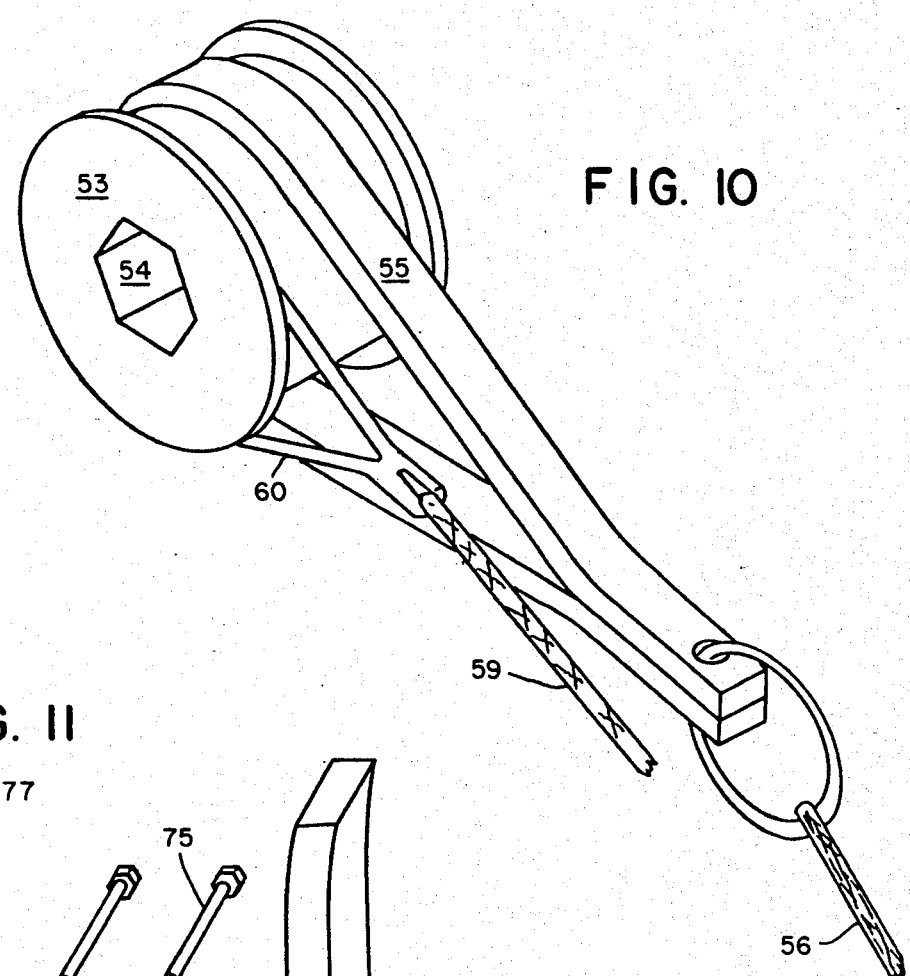
FIG. 10 is a close-up view of the brake mechanism of the alternate brake—a metal drum that fits over the hexrod of the wheelpiece; braking strap; shockcord; and low friction connection of the shockcord to the metal drum.

A brake of a different form, as shown in FIGS. 9 and 10, would be sufficient on most trailers and would require fewer parts. A metal drum 53 with a hexagonal aperature 54 is placed over the hexrod 5 of the wheelpiece 1 on either side of the long handled ratchet 2. A strap 55 placed over the drum 53 is tightened to brake the wheel 4. A steel rope 56 tied between the straps 55 on each side of the trailer is run through an eye 57 opposite the strap 55 on each drum 53. A second line 58 fastened at the center of the crossline 56 extends to the front of the trailer where it can be pulled to tighten the crossline 56 and the straps 55 that encircle the brake drums 53. A shockcord 59 is fastened between the steel rope 56 and a low friction fitting 60 that encircles each brake drum 53. These shockcords 57 at each end of the crossline 56 will hold the crossline 56 tight and the straps 55 loose when the brakes are not applied. The line 58 extending to the front of the trailer is a two part line in FIG. 9, a low stretch steel rope 58a and a larger diameter line 58b for pulling, tying, or cleating by hand. The eye 57 opposite the strap 55, shown in FIG. 9 is placed on a cross piece 61. This cross piece 61 is bolted to the trailer frame 38 by a U-bolt 62 on each side of the trailer frame 38. The cross piece could be a piece of lumber. The eye 57 could also be fastened to the trailers fender, not shown.

TRAILER TONGUE EXTENSION

The trailer tongue extension does two things. It lengthens the trailer's tongue for greater leverage, and it provides automatic braking of only the pivot wheel for one wheel at a time forward or rearward leverage and motion.

This extension 63 is one solid piece in the shape of a large 'T' with the vertical stem of the 'T' 63a running along the trailer tongue 47 and extending forward of the trailer. The cross line of the 'T' forms two right angle levers 63b and 63c. At the top center of the 'T' there is a hole 64 that pivots about a cylindrical rod 65 protruding vertically from the top of the trailer tongue 47. This cylinderical rod 65 can be a large bolt bolted in place in a hole, not shown, that is drilled vertically through the trailer tongue 47. The trailer tongue extension 63 is placed on top of the trailer tongue 47 with the pivotal hole 64 placed over the cylindrical rod 65. It is then tied in place by two lines 66a and 66b. One line, 66a, is tied firmly several times around the trailer tongue 47 and the extension 63 directly forward of the two right angle levers 63a and 63b. The other line 66b is tied around the tongue 47 and the extension 63 at the front of the trailer tongue 47 where on most trailers there is a large eye for fastening safety chains from the trailer to the towing vehicle.

This extension is firmly fastened to the trailer tongue 47 to enable a person to move the trailer at the front end of the trailer tongue extension 63a. There remains a small amount of pivoting of the extenion 63 and the right angle levers 63a and 63b. This motion of the levers 63a and 63b can be used to alternately apply the brakes on one side of the trailer at a time. To move one wheel forward at a time without using the long handled ratchets 2, a line from the eye 42 at the end of each brake lever 37 is run through an eye 67 at the center of the trailer and then forward to the levers, 63a and 63b of the trailer tongue extension 63.

If the line 68 from each brake lever 37 is firmly fastened to the end of the right angle lever 63a and 63b on the same side of the trailer, the trailer will travel backwards as the front of the trailer is moved back and forth by a person at the front of the trailer tongue extension 63. If the brake lines 68 are crossed if the brake line 68 from each wheel 4 is fastened to the right angle lever 63a or 63b on the opposite side of the trailer, then the trailer will travel forward when the trailer tongue is moved from side to side.

The brake lines 68 of the trailer tongue extension 63 are a low stretch cotton line and a small cam cleat 69 is placed at the end of each right angle lever 63a and 63b. This will enable the brake lines 68 to be easily fastened and adjusted to the proper tension. This will also enable the brake lines 68 to be easily unfastened and crossed or uncrossed to change the direction of movement of the trailer.

WHEEL TRACTION DEVICE

Figure 11:
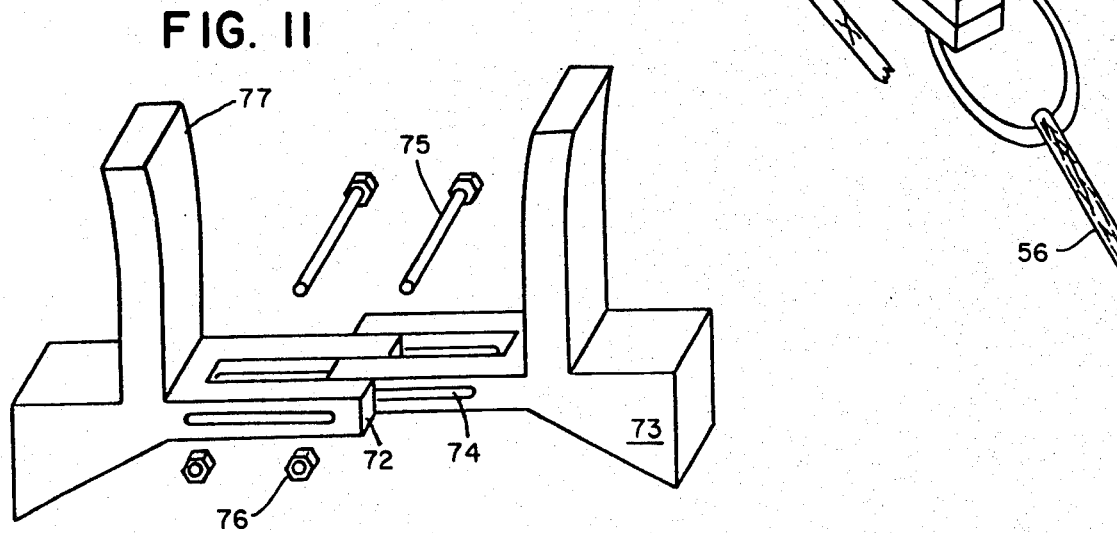
FIG. 11 is an exploded view of the wheel traction device.
Figure 12:
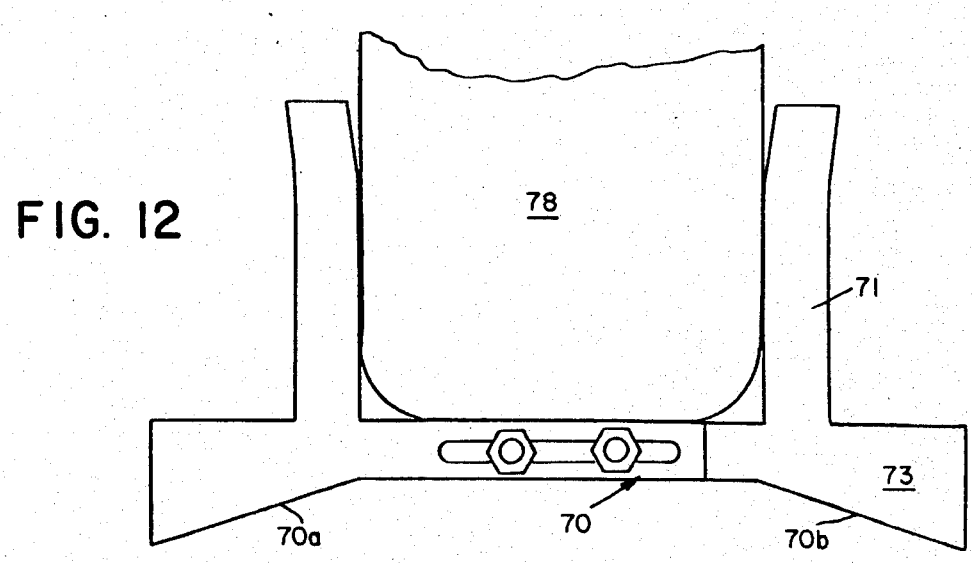
FIG. 12 is a wheel traction device in place around a tire.

The wheel traction device 70 is shown in FIGS. 11 and 12. It is constructed of two identical parts, 70a and 70b. This part has a vertical stem 71 and a base that has two or more fingers 72 extending in one direction and a short downward wedge 73 extending in the opposite direction. Each finger 72 contains a long longitudinal hole 74 through which two bolts 75 and nuts 76 can be placed to bolt the two halves, 70a and 70b of an assembled wheel traction device together. The top of the vertical stem 71 has a slight flare 77 aware from the inside of the assembled wheel traction device. This enables a tightly adjusted wheel traction device to be easily pushed on over the end of a tire 78. This wheel traction device would be used on a heavy trailer for traction to rotate the wheel out of a deep hole.

In summary, my invention relates mainly to the art of manually moving a trailer and the art of maintaining a boat in a two-wheeled trailer at the beach. It provides a trailer accessory which capitalizes upon the complementary and inherent design characteristics of a standard two-wheeled highway trailer to enable the trailer itself to be used for leverage in moving the loaded trailer by several techniques. The accessory provides leverage on each individual wheel to lift and turn it up and out of a hole and can restrict the rotation of the wheels to only one direction, forward only or backward only, and enable a loaded two-wheeled trailer to be moved manually by one person over difficult terrain, such as a boat trailer on the beach, and can brake the motion of the trailer in both directions, and further consists of three easily standardized parts that are easily placed on any two wheeled trailer.

The two complementary and inherent design characteristics of a two-wheeled trailer here capitalized upon are: There is a trailer tongue that extends far forward of and at right angles to the axle of the wheels, and this trailer tongue is easily lengthened or extended; and the load carried on a two-wheeled trailer can be easily positioned fore and aft to provide a very light, neutral or a negative tongue weight. This favorable shape and weight distribution enables the trailer tongue to be used for leverage to move the trailer by any of several techniques if the wheels are enabled to turn in only the direction of intended motion. The several techniques of using trailer tongue leverage include the following: moving one wheel forward (or backward) at a time by moving the trailer tongue from side to side; lifting the trailer tongue up into the air while it is tied to a distant object (see FIG. 1); lifting and lowering the trailer tongue to apply rotation to the wheels when the wheels are enabled to roll in only one direction in relation to the trailer frame and in relation to the ground; carefully steering and leveraging with the first technique with a long light weight wooden plank under each wheel; and, any combination of these preceding techniques.

The three basic components of the invention are for each wheel: a wheelpiece that fastens to the outside of the wheel and which contains a hexrod protruding outward in the axis of rotation of the wheel; a ratchet that fits over the hexrod of the wheelpiece and which has a long handle that pivots to enable it to be taken in hand, to be left on the ground, or to be tied to the trailer frame; and, a brake that also fits over the hexrod of the wheelpiece and that is operated by a line at the front of the trailer.

The long handled ratchet preferably has the following three part construction: a ratchet head that contains the following: a two bubbled hexagonal shaft spur gear and a two sided latch contained in a metal casing and a shockcord or a spring on the outside of the casing that forces the latch into contact with the gear and that can be readjusted to force the latch to contact the gear in the opposite direction without disengaging the latch from the gear; and a pivoting metal handle that is a rectangular metal rod formed into a semicircle to contain the ratchet head, and that is welded in its center to a metal tube that has been semi-flattened at the end that welded to the rod; and, a long round wooden handle that is placed in the end of the metal tube of the pivoting metal handle to lengthen it for leverage.

Preferably, the wheelpiece has (1) a round flat circular base that fits on the outside of the trailer wheel on that part of the wheel that holds the cord of the tire to standardize the diameter of the base to one size for a given tire rim size; (2) an outward protruding cup shaped center to accomodate the axle of the wheel and to position the hexrod, and therefore the ratchet and the brake out away from the wheel and the fender; (3) positioned in the cup shaped center of the wheelpiece a fitting to hold the hexrod to turn with the wheelpiece and the trailer wheel in the axis of rotation of the wheel; and (4) a cut away section in the base for access to the tire valve stem and several holes in the base through which to fasten the wheelpiece to the wheel by any of several means which include long self-threading screws screwed into plugs in the spaces in the wheel or into holes drilled into the central part of the trailer wheel.

The mechanical brake shown in FIGS. 2, 6, 7, and 8 is an inside cylinder with a hexagonal aperture enclosed by two outside cylinders that are fastened to the end of a lever. The outside cylinders ride on two low friction bushings between the cylinder and the hexrod when the end of the lever is parallel to the hexrod of the wheelpiece or to the axis of rotation of the wheel. When the end of the lever is deflected from being parallel to the hexrod or the axis of the wheel the outside cylinders move, one forward and one backward, to place the outside cylinders into contact with the inside cylinder to produce friction for braking. The lever is prevented from turning with the wheel by enclosing the end of the lever in a bracket that is fastened to the trailer frame, FIG. 2, or by loosely tying the end of the lever with a line to the trailer frame, FIG. 8. A line is tied between the ends of the levers on each wheel and this crossline is held tight by a shockcord from each lever end to the trailer frame. The brakes are applied by pulling a line at the front of the trailer which in turn pulls at the center of the crossline which deflects the brake levers to apply the brakes.

The brake shown in FIGS. 9 and 10 is a metal cylinder with a hexagonal aperture to fit over the hexrod of the wheelpiece and a strap that is tightened over the metal drum to produce friction for braking. A line is tied between the straps; across the trailer and on each side of the trailer through an eye that is fastened to the trailer opposite the strap and the drum. This crossline is held taut by a couple of shockcords tied between the line end and a low friction fitting on each brake drum. A line fastened at the center of the crossline is pulled at the front of the trailer to tighten the crossline and the straps to apply the brakes.

The trailer tongue extension of FIG. 8 lengthens the trailer tongue for leverage and automatically brakes one wheel at a time to enable the trailer to be advanced one wheel at a time using the trailer tongue length for leverage without the use of the long-handled ratchets. This trailer tongue extension is shaped like a large 'T' with a pivot hole at the intersection of the vertical stem and the cross stem of the 'T'. There is a small cam cleat at each end of the cross stem to which the line from each brake can be fastened and adjusted. The 'T' shaped trailer tongue extension is placed on the trailer tongue with the pivot hole of the trailer tongue extension fitting over a rod extending vertically from the trailer tongue and with the stem of the 'T' extending out in front of the trailer tongue. The trailer tongue extension is then tied to the trailer tongue in one or more places to hold them together but to allow a slight pivoting of the extension that will move one side of the cross stem of the 'T' forward and the other side backward as the front of the trailer tongue extension is pushed to one side. This trailer tongue extension is shown in FIG. 8, but unlike as shown in FIG. 8, the long handled ratchet could be omitted from each wheel.

Also, I have shown a device to be used on a heavy trailer for traction to rotate a wheel out of a very deep hole. This device as shown in FIGS. 11 and 12 is constructed of two identical halves that are bolted together to produce a size to fit the width of a given tire. The assembled wheel traction device fits snugly over the end of a tire and extends out beyond the tire and downward on the inside and the outside of the wheel.

I claim:

1. Apparatus for manual movement by one person of a two-wheeled trailer for boats or the like that includes a frame, a pair only of laterally spaced wheels supporting said frame at the rearward end thereof, and an elongated longitudinally extending towing tongue at the forward end of said frame, said apparatus being adapted to be attached to said trailer and comprising a wheel piece for removable but rigid mounting on the outside of each of said two wheels to rotate therewith, each wheel piece having a laterally outwardly extending central hub coaxial with the axis of said wheels when the piece is mounted on its respective wheel, said hub being adapted to receive manually applied torque for transmittal by said wheel pieces into said wheels, first means for operative connection to one of said hubs to manually apply torque and thus to a wheel, second means for operative connection to the other of said hubs to manually apply torque thereto and thus to a wheel, said first and second means being adapted to be operated separately so that torque can be applied alternately to each of said two wheels, said tongue comprising a lever means for applying leverage to move the frame, each wheelpiece including a rod in torque transmitting relationship with and extending axially outwardly from the hub and providing a torque transmitting connection means for applying torque to the hub and wheelpiece, said first and second means being adapted for operative connection to said rods.

2. Apparatus as set forth in claim 1 wherein each rod is non-circular in cross section, said hubs having non-circular openings to removably receive said rods in torque transmitting connections.

3. Apparatus as set forth in claim 1 including a wheel traction device comprising a pair of interfitting parts each including wedge portions for traction and removable means for securing interfitting portions of the parts together so that other portions thereof are clamped against opposed sides of a wheel.

4. Apparatus as set forth in claim 1 wherein said tongue extends forwardly for a distance that is at least three times the spacing between the wheels.

5. Apparatus as set forth in claim 1 including means for alternatively operating said first and second means to alternatively restrict movement of one wheel or the other whereby alternate sidewise movement of the tongue alternatively pivots the frame on one or the other of said wheels and produces longitudinal movement of the trailer.

6. Apparatus as set forth in claim 1 wherein said first and second means comprise ratchet devices for applying torque to rotate a wheel in one direction and resist rotation of a wheel in the opposite direction.

7. Apparatus as set forth in claim 6 wherein said ratchet devices include long handles forming levers to apply torque thereto, said handles being long enough to engage the ground beneath the trailer and such engagement limiting the turning thereof to less than a full turn.

8. Apparatus as set forth in claim 1 wherein said first and second means comprise braking devices including cylinders mounted on said rods for applying braking friction to resist wheel rotation in both forward and rearward directions.

9. Apparatus as set forth in claim 8 wherein said first and second means also include ratchet devices connected to said rods for applying torque to rotate a wheel in one direction and resist rotation of a wheel in the opposite direction.

10. Apparatus as set forth in claim 8 including flexible cable means interconnecting the braking devices to synchronize operation thereof.

11. Apparatus as set forth in claim 8 including a tongue extension member pivotally mounted on the tongue and flexible cable means connected to said extension and to said braking devices to alternatively operate them whereby manual pivotal movement of the extension manually operates said devices.

12. Apparatus as set forth in claim 9 including a line for connecting in said tension the front of the trailer to a forward stationary object and means for applying both braking devices whereby alternate lifting and lowering of the tongue when the trailer is tied to said object advances the trailer in a direction parallel to said line by increasing tension in the line when said braking devices are applied.

13. Apparatus for manual movement by one person of a two-wheeled trailer for boats or the like that includes a frame, a pair only of laterally spaced wheels supporting said frame at the rearward end thereof, and an elongated longitudinally extending towing tongue at the forward end of said frame, said apparatus being adapted to be attached to said trailer and comprising a wheel piece for removable but rigid mounting on the outside of each of said two wheels to rotate therewith, each wheel piece having a laterally outwardly extending central hub coaxial with the axis of said wheels when the piece is mounted on its respective wheel, said hub being adapted to receive manually applied torque for transmittal by said wheel pieces into said wheels, first means for operative connection to one of said hubs to manually apply torque thereto and thus to a wheel, second means for operative connection to the other of said hubs to manually apply torque thereto and thus to a wheel, said first and second means being adapted to be operated separately so that torque can be applied alternately to each of said two wheels, said tongue comprising a lever means for applying leverage to move the frame, said first and second means comprising ratchet devices for applying torque to rotate a wheel in one direction and resist rotation of a wheel in an opposite direction, said ratchet devices including long handles forming levers to apply torque thereto, said handles being long enough to engage the ground beneath the trailer and such engagement limiting the turning angle thereof to less than a full turn.

14. Apparatus for manual movement by one person of a two-wheeled trailer for boats or the like that includes a frame, a pair only of laterally spaced wheels supporting said frame at the rearward end thereof, and an elongated longitudinally extending towing tongue at the forward end of said frame, said apparatus being adapted to be attached to said trailer and comprising a wheel piece for removable but rigid mounting on the outside of each of said two wheels to rotate therewith, each wheel piece having a laterally outwardly extending central hub coaxial with the axis of said wheels when the piece is mounted on its respective wheel, said hubs being adapted to receive manually applied torque for transmittal by said wheel pieces into said wheels, first means for operative connection to one of said hubs to manually apply torque thereto and thus to a wheel, second means for operative connection to the other of said hubs to manually apply torque thereto and thus to a wheel, said first and second means being adapted to be operated separately so that torque can be applied alternately to each of said two wheels, said tongue comprising a lever means for applying leverage to move the frame, said first and second means including braking cylinders extending axially outwardly of said hubs and adapted to receive braking friction to resist wheel rotation.

15. Apparatus for manual movement by one person of a two-wheeled trailer for boats or the like includes a frame, a pair only of laterally spaced wheels supporting said frame at the rearward end thereof, and an elongated longitudinally extending towing tongue at the forward end of said frame, said apparatus being adapted to be attached to said trailer and comprising a wheel piece for removable but rigid mounting on the outside of each of said two wheels to rotate therewith, each wheel piece having a laterally outwardly extending central hub coaxial with the axis of said wheels when the piece is mounted on its respective wheel, said hub being adapted to receive manually applied torque for transmittal by said wheel pieces into said wheels, first means for operative connection to one of said hubs to manually apply torque thereto and thus to a wheel, second means for operative connection to the other of said hubs to manually apply torque thereto and thus to a wheel, said first and second means being adapted to be operated separately so that torque can be applied alternately to each of said two wheels, said tongue comprising a lever means for applying leverage to move the frame.

* * * * *